WALTER J. KRUPICK
RICHARD F. CIMERA
INVENTORS

BY
Thomas W. Kennedy
ATTORNEY

WALTER J. KRUPICK
RICHARD F. CIMERA
INVENTORS

BY Thomas W. Kennedy
ATTORNEY

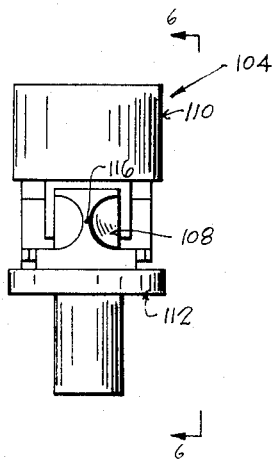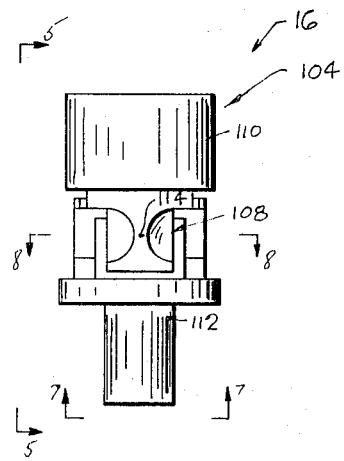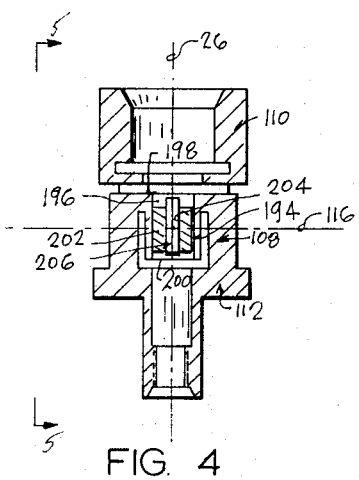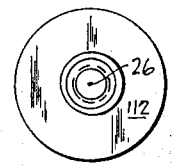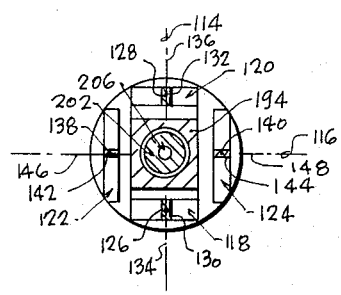

Nov. 28, 1967

W. J. KRUPICK ET AL 3,354,726

TWO-AXIS GYRO

Filed Sept. 2, 1965

WALTER J. KRUPICK
RICHARD F. CIMERA
INVENTORS

BY

*Thomas W. Kennedy*

ATTORNEY

United States Patent Office 3,354,726
Patented Nov. 28, 1967

3,354,726
TWO-AXIS GYRO
Walter J. Krupick, Succasunna, and Richard F. Cimera, Caldwell Township, N.J., assignors to General Precision Inc., Little Falls, N.J., a corporation of Delaware
Filed Sept. 2, 1965, Ser. No. 484,648
20 Claims. (Cl. 74—5)

The present invention relates to a two-degree-of-freedom gyro, and particularly to a two-degree-of-freedom gyro of the type having a universal-joint type of rotor-to-shaft interconnection.

A prior art gyro of the type having a universal-joint rotor-shaft interconnection includes a rotor, a rotor shaft, a stator in which said rotor shaft is journaled, and a universal-joint connection between said rotor and said shaft.

One type of prior art universal-joint connection is the two-piece ball and socket connection as described in U.S. Patents Nos. 1,192,532 and 1,639,233. One problem with said ball-socket connection is its frictional restraint, which causes gyro drift errors.

Another prior art universal-joint connection is the one-piece solid flexure rod with a necked-down center portion as described in U.S. Patents Nos. 2,995,938 and 3,077,785, that are assigned to the same assignee as in this invention. One problem with said flexure rod connection is its relatively high spring restraint, which causes gyro drift errors.

Still another prior art universal-joint connection is the three-piece, three-gimbal assembly having journaled-pin bearings as described in U.S. Patent No. 2,947,178 and the French Patent No. 509,447. One problem with the three-piece gimbal unit is the pivot backlash and lost motion of adjacent gimbals due to bearing clearances, which cause gyro drift errors.

A further prior art universal-joint connection is the one-piece, three-gimbal units as described in the publication entitled "The Dynamically Tuned Free Rotor Gyro," Control Engineering, June 1964, pp. 67-72. Such three-gimbal unit has a middle gimbal disposed in a radial direction between its fly-wheel gimbal and its shaft gimbal and has criss-cross flexure-bar pivots interconnecting the middle gimbal to the other said gimbals. One problem with such gimbal unit is that its criss-cross flexure bar pivots allow shifting of the pivot axes, which causes gyro drift errors. Another problem with such gimbal unit is that its radially intermediate middle gimbal is not adjustable in size for varying its moment in inertia-to-mass ratio whereby the gyrodynamic negative spring rate might be calibrated. Still another problem with said prior art gimbal unit is that it is difficult to minimize the static spring restraint of the gimbal unit without sacrificing its overall structural strength.

In accordance with one embodiment of the present invention, spring restraint is minimized, shifting of the pivot axes is minimized, and adjustment and calibration of the dynamic anti-spring rate for a fixed operating speed of the flexure is facilitated by using a one-piece, three-gimbal, four-flexure bar, universal-joint flexure hinge unit. Said four flexure bars, which have a thin hinge section, are arranged to provide a substantially equal stiffness and restraint against forces parallel to the spin axis and parallel to the two pivot axes. In this way, the ratio of static spring restraint to structural strength of the flexure hinge unit is minimized. In addition, said three gimbals are axially spaced, and the middle gimbal, which oscillates at operating speed and causes a dynamic anti-spring rate, is smaller than the two end gimbals. In this way, the ratio of dynamic anti-spring rate to structural strength of the flexure hinge unit is also minimized.

Accordingly, it is one object of the invention to provide a two-axis gyro of the type having a universal-joint rotor-shaft connection, in which gyro drift error is minimized and in which friction restraint, spring restraint and pivot backlash is eliminated.

It is another object of the invention to provide a two-axis gyro according to the aforementioned object, in which the universal-joint connection is a one-piece zero-spring-rate flexure-type multi-gimbal universal-joint connection.

It is still another object of the invention to provide a gyro flexure-type multi-gimbal shaft-rotor connection according to the aforementioned objects, which has a low ratio of dynamic negative spring rate to structural strength, which has a low ratio of static positive spring rate to structural strength, which has a torsional stiffness that is roughly equal to its axial stiffnesses, which has a shear stiffness that is roughly equal to its spin axis stiffness, and which has a dynamic anti-spring rate that is substantially equal to its static spring rate at a fixed rotor operating speed.

To the fulfillment of these and other objects, the invention provides a one-piece, three-gimbal, four-flexure bar, universal-joint flexure hinge unit comprising a middle gimbal portion, an upper end gimbal portion, and a lower end gimbal portion. Said middle gimbal portion has a peripheral wall with a longitudinal axis and with axially-spaced end faces and has a first radial pivot axis and also a second radial pivot axis disposed in quadrature with said longitudinal axis and intersecting therewith at a common pivot point. Said upper end gimbal portion is disposed axially outwardly of one of said middle gimbal end faces and has two flexible bars integral therewith the cantilevered therefrom and axially spaced along said first pivot axis with fixed-end connections to said middle gimbal portion. Said lower end gimbal portion is also disposed axially outwardly of the other of said middle gimbal end faces and has two flexure bars integral therewith and cantilevered therefrom and axially spaced along said second pivot axis with fixed-end connections to said middle gimbal portion.

Other objects of the invention will become apparent upon reading the annexed detailed description in connection with the drawings, wherein like parts are designated by like numerals throughout the several views, and wherein:

FIG. 4 is an enlarged portion of FIG. 1;

FIG. 5 is a sectional view taken along the line 5—5 of FIG. 4;

FIG. 6 is a sectional view taken along the line 6—6 of FIG. 5;

FIG. 7 is a sectional view taken along the line 7—7 of FIG. 6;

FIG. 8 is a sectional view taken along the line 8—8 of FIG. 6;

Figure 1:
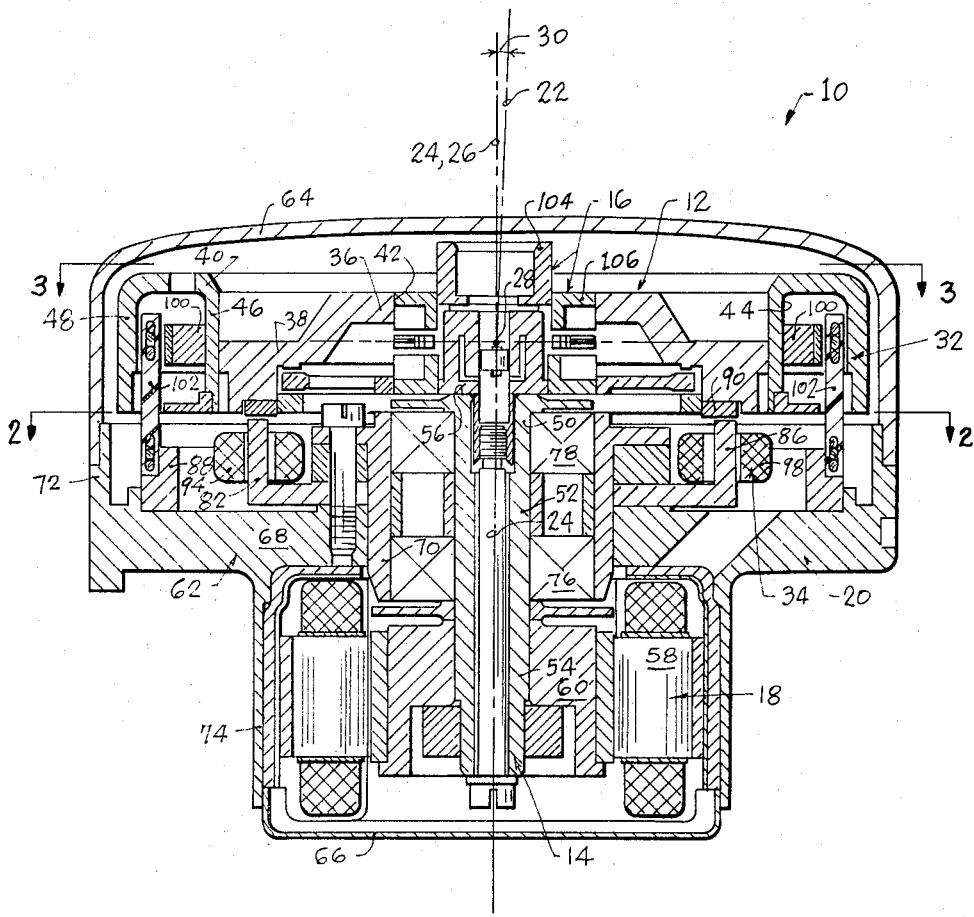
FIG. 1 is a sectional view of a two-axis gyro embodying features of the present invention.
Figure 2:
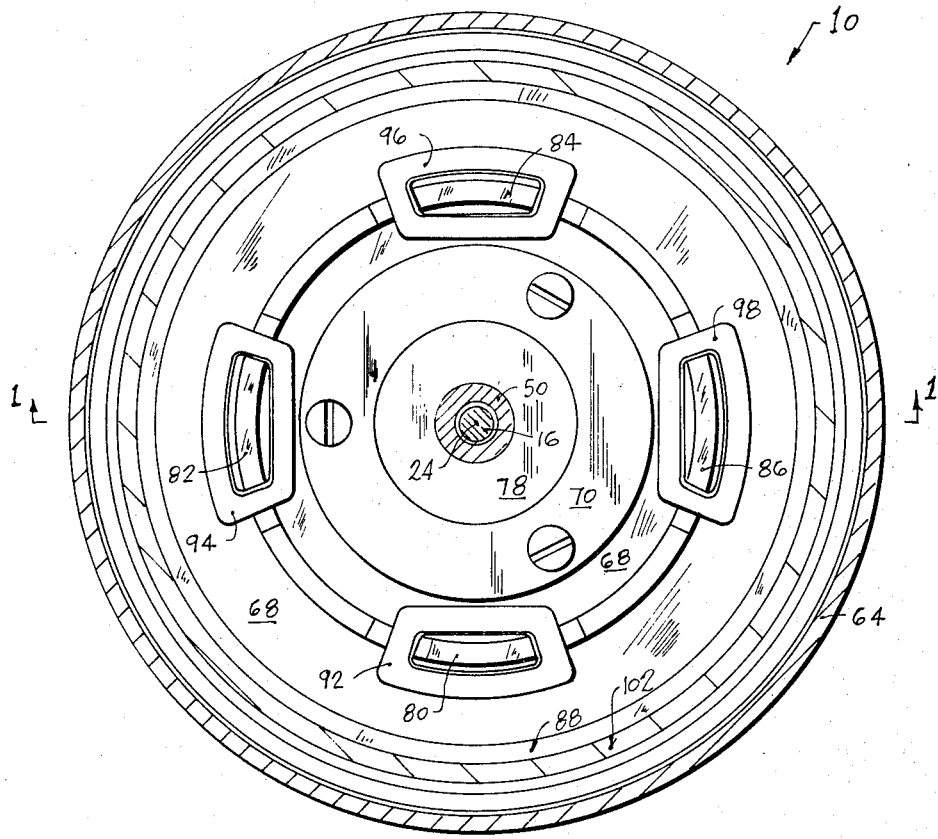
FIG. 2 is a sectional view taken along the line 2—2 of FIG. 1.
Figure 3:
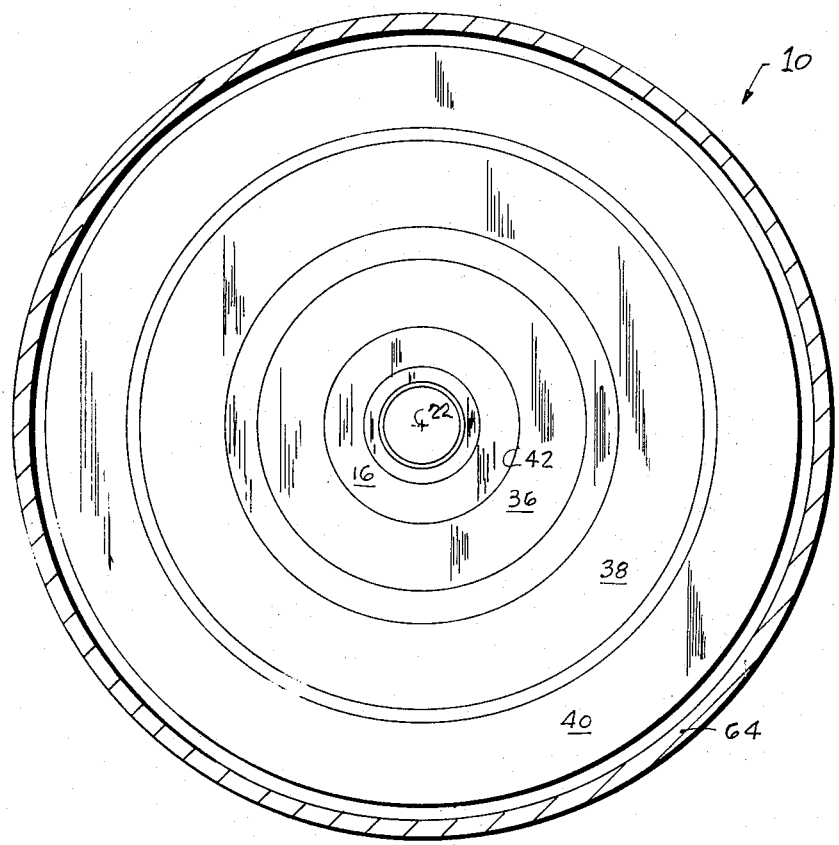
FIG. 3 is a sectional view taken along the line 3—3 of FIG. 1.
Figure 9:
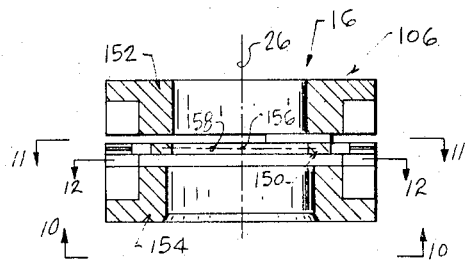
FIG. 9 is another enlarged portion of FIG. 1.
Figure 13:
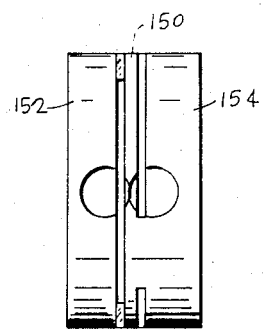
FIG. 13 is a sectional view taken along the line 13—13 of FIG. 10.
Figure 10:
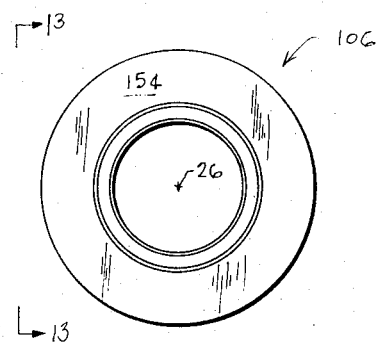
FIG. 10 is a sectional view taken along the line 10—10 of FIG. 9.
Figure 12:
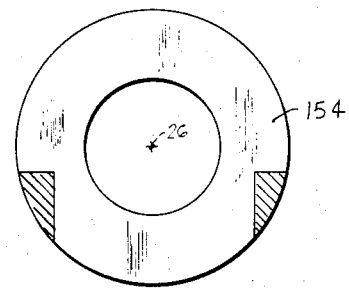
FIG. 12 is a sectional view taken along the line 12—12 of FIG. 9.
Figure 11:
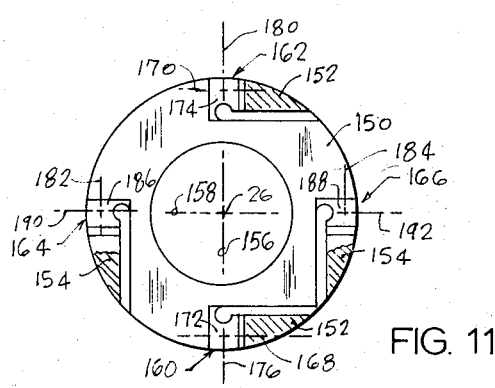
FIG. 11 is a sectional view taken along the line 11—11 of FIG. 9.
Figure 14:
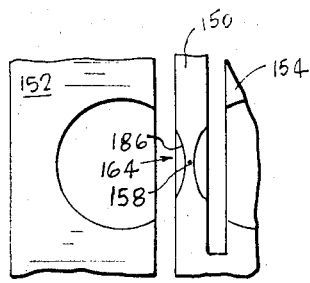
FIG. 14 is an enlarged portion of FIG. 13.

Referring to the drawings, one embodiment of the present invention is a two-axis gyro 10. Gyro 10, which is a flexure-joint-suspended, free-rotor gyro, comprises a flywheel rotor 12, a shaft 14, and a one-piece frictionless gimbal-type hinge assembly 16, which interconnects shaft 14 to rotor 12 forming a universal-joint therebetween. Gyro 10 also has a drive means 18, which is operably connected to shaft 14 for rotating rotor 12 and shaft 14. In addition, gyro 10 has a support housing 20, which supports shaft 14, rotor 12 and drive 18.

Rotor 12 has a rotor spin axis 22. Shaft 14 also has a shaft axis 24. Hinge assembly 16, which is a universal-joint for tilting of rotor 12 in any direction, has a longitudinal gimbal axis 26. Axis 26 has a pivot point 28 thereon, which is the intersection of axis 22 with axis 24. Axis 22, axis 24 and axis 26 are also normally aligned when gyro 10 is at a null condition. In operation, axis 22 and axis 24 normally have an angle of tilt 30 therebetween.

Gyro 10 also has a torquer means 32 for varying tilt angle 30 in any direction; and has a pickoff means 34 for sensing a change in tilt angle 30 in any direction.

Rotor 12, which is in the shape of a wheel, has an annular hub portion 36, which is fixedly connected to hinge assembly 16, an annular web portion 38, which is fixedly connected to hub 36 extending radially outwardly therefrom, and an annular channel-shaped rim portion 40, which is fixedly connected to web 38 extending radially outwardly therefrom. Hub 36 has a circular radially inner surface 42, which is concentric about axis 22. Channel rim 40, which has a U-shape in cross-section and which is preferably a circular channel member, has an annular recess 44, which faces in an axially inward direction. Rim 40 has a radially inner flange 46 and a radially outer flange 48. Flanges 46, 48 are concentric about axis 22, point in a radially inward direction, and form the sidewalls of recess 44.

Shaft 14 has an upper end portion 50, which is fixedly connected to hinge assembly 16, a coaxial center portion 52, which is supported by housing 20, and a coaxial lower end portion 54, which is fixedly connected to drive 18. End 50 has an end face 56, which is connected to hinge assembly 16.

Drive 18, which is preferably a conventional electric motor, has an outer wound stator 58, which is fixedly connected to housing 20, and has an inner armature 60, which is fixedly connected to shaft end 54 and which is rotatable relative to stator 58.

Housing 20, which is coaxial with shaft 14 along axis 24, has an annular frame member 62 for connection to a vehicle (not shown), an upper cap member 64 for enclosing rotor 12, and a lower cap member 66 for enclosing drive 18.

Frame 62 includes an annular, flat plate 68, which is coaxial with shaft 14 and drive 18, for connection to said vehicle (not shown) for support of gyro 10 therefrom. Plate 68 has an integral, coaxial, center sleeve 70, which forms a bearing for shaft 14. Plate 68 also has an integral, cylindrical, upper flange 72, which extends in an axially upward direction from plate 68 and which connects to cap 64 at the upper end thereof for support of cap 64 therefrom. Plate 68 also has an integral, cylindrical, lower flange 74, which extends in an axially downward direction from plate 68 and which connects to cap 66 at the lower end thereof for support of said cap 66 therefrom. Flange 74, which is disposed radially outwardly of drive 18, connects to stator 58 of drive 18 for support of drive 18 by frame 62. Sleeve 70 supports a pair of axially-spaced ball-bearing units 76, 78. Bearing units 76, 78, which are mounted on the radially innerside of sleeve 70, are press-fitted over shaft center portion 52.

Plate 68 has four pickoff support bars 80, 82, 84, 86, which extend in an axially upward direction therefrom for support of pickoff means 34 and which are equiangularly spaced about shaft axis 24 at equal radial distances therefrom. Plate 68 also has an integral torquer support ring 88, which extends in an axially upward direction therefrom for support of torquer means 32. Plate 68, sleeve 70, flange 72, flange 74, ball-bearing units 76, 78, and torquer support ring 88 are all concentric about shaft axis 24.

Pickoff 34 includes an annular magnet ring 90, which is fixedly connected to web 38, and also includes four small coils 92, 94, 96, 98, which are equiangularly spaced about shaft axis 24 and which are respectively wound on bars 80, 82, 84, 86.

Torquer 32, which is a two-axis type of torquer, includes a magnet means 100, which is fixedly connected to rim 40, and includes a coil means 102, which is fixedly connected to support ring 88.

According to the invention, hinge assembly 16 includes a one-piece, three-gimbal, four-bar, inner hinge unit 104, and includes a one-piece, three-gimbal, four-bar, outer hinge unit 106.

Inner hinge unit 104, which is a universal-joint flexure unit, includes a middle gimbal portion 108 which is symmetrical about gimbal axis 26, an upper end gimbal portion 110, which is axially spaced from gimbal 108 along axis 26 on the upper side thereof and a lower end gimbal portion 112, which is axially spaced from gimbal 108 along axis 26 on the lower side thereof.

Middle gimbal 108, which is a rectangular block, has a first pivot axis 114, which intersects axis 26 at its pivot point 28 substantially at right angles to axis 26; and gimbal 108 has a second pivot axis 116, which intersects axis 26 and axis 114 at pivot point 28 substantially at right angles to axis 114.

Upper gimbal 110 is disposed in an axially outward direction from gimbal 108 and is fixedly connected to rotor 12 coaxially therewith. Gimbal 110 has two inner flexure bars 118, 120, which are respectively integral therewith at one end thereof, which are cantilevered therefrom, which are axially spaced along axis 114 and which are respectively fixedly connected to gimbal 108 at the other end thereof.

Lower gimbal 112 is disposed in an axially outward direction from gimbal 108 and is fixedly connected to shaft 14 coaxially therewith. Gimbal 112 has two inner flexure bars 122, 124, which are respectively integral therewith at one end thereof, which are cantilevered therefrom, which are axially spaced along axis 116 and which are respectively fixedly connected to gimbal 108 at the other end thereof.

Bars 118, 120, which are identical to each other, have respective longitudinal axes 126, 128 that are parallel to each other and parallel to axis 26 at gyro null condition. Bars 118, 120 have necked-down center portions 130, 132 with respective hinge axes 134, 136 that are aligned colinearly along axis 114.

Bars 122, 124, which are substantially identical to bars 118, 120, have respective longitudinal axes 138, 140 that are parallel to each other and parallel to axis 26 at gyro null condition. Bars 122, 124 have respective necked-down center portions 142, 144 with respective hinge axes 146, 148 that are also aligned colinearly along pivot axis 116. With this construction, bars 118, 120, 122, 124 have substantially equal spring rates about their respective axes 114, 116.

Outer hinge unit 106, which is also a universal-joint flexure unit, includes a middle gimbal portion 150, which is symmetrical about axis 26, and upper end gimbal portion 152, which is axially spaced from gimbal 150 along axis 26 on the upper side thereof, and a lower end gimbal portion 154, which is axially spaced from gimbal 150 along axis 26 on the lower side thereof.

Middle gimbal 150, which is disposed radially outwardly of middle gimbal 108 and which is a circular ring, has a first pivot axis 156, which intersects axis 26 at its pivot point 28 substantially at right angles to axis 26; and has a second pivot axis 158, which intersects axis 26 and first pivot axis 156 at pivot point 28 substantially at right angles to first pivot axis 156. Axes 114 and 156 are aligned; and axes 116 and 158 are aligned.

Upper gimbal 152 is disposed radially outwardly of and fixedly connected to upper gimbal 110, is disposed in an axially outward direction from middle gimbal 150 and is fixedly connected to rotor 12 coaxially therewith. Upper gimbal 152 has two outer flexure bars 160, 162, which are respectively integral therewith at one end thereof, which are cantilevered therefrom, which are axially spaced along first pivot axis 156 and which are respectively fixedly connected to middle gimbal 150 at the other end thereof.

Lower gimbal 154 is disposed radially outwardly of and is fixedly connected to lower gimbal 112, is disposed in an axially outward direction from middle gimbal 150 and is fixedly connected to shaft 14 coaxially therewith. Lower gimbal 154 has two outer flexure bars 164, 166, which are respectively integral therewith at one end thereof, which are cantilevered therefrom, which are axially spaced along second pivot axis 158 and which are respectively fixedly connected to middle gimbal 150 at the other end thereof.

Bars 160, 162, which are identical to each other, have respective longitudinal axes 168, 170 that are parallel to each other and are also coplanar at gyro null condition. Bars 160, 162 have necked-down center portions 172, 174 with respective hinge axes 176, 180 that are aligned colinearly along first pivot axis 156.

Bars 164, 166, which are substantially identical to bars 160, 162, have respective longitudinal axes 182, 184 that are parellel to each other and coplanar with axes 168, 170 at gyro null condition. Bars 164, 166 have respective necked-down center portions 186, 188 with respective hinge axes 190, 192 that are aligned colinearly along second pivot axis 158. Preferably, cross-sections of center portions 172, 174, 186, 188 are not only identical to each other, but are also substantially like to those of center portions 130, 132, 142, 144. In addition, the respective radial offsets from axis 26 to each longitudinal axis 126, 128, 138, 140 are preferably equal in length; and also the respective radial offsets from axis 26 to each longitudinal axis 168, 170, 182, 184 are also equal in length to each other.

Gimbal 108 has an outer peripheral wall 194, which connects to bars 118, 120, 122, 124 on the radially outer side thereof. Wall 194 has a cylindrical, open-ended cavity 196, which is concentric about axis 26. Wall 194 has a pair of axially-outwardly-facing ends faces 198, 200, which respectively face gimbal 110 and gimbal 112. Gimbal 108 also has a cylindrical dynamic balance weight 202, which is snugly receved in cavity 196 and which is adjustably displaceable along axis 26 relative thereto for adjusting and calibrating the dynamic negative spring rate of hinge assembly 16 and rotor 12.

Weight 202 has a cylindrical opening 204, which extends therethrough and which is also concentric about axis 26. Weight 202 also has a fine-tuning cylindrical rod 206, which is snugly received in opening 204 and which is adjustably displaceable along axis 26 relative to weight 202 and relative to gimbal 108 in order to provide a delicate vernier-type adjustment of the dynamic negative spring rate of hinge assembly 16 and rotor 12 for a fixed gyro operating speed. In this way, the dynamic negative spring rate of gyro 10 can be made equal and opposite to the static positive spring rate of gyro 10 at a fixed operating speed.

With this construction, gyro 10 can be adjusted to have a zero spring rate for a fixed rotor speed at the gyro operating condition. In addition, gyro 10 can be easily recalibrated for a different fixed rotor speed for a different gyro operating condition by using a different length of rod 206 and readjusting the axial position or rod 206 relative to wall 194 and weight 202.

In summary, inner hinge 104 by itself has certain advantages:

(1) Flexure bars 118, 120, 122, 124, which preferably have the same-size center-portion cross-section with the same-length radial offsets from axis 26, provide a uniform transverse elasticity and a uniform transverse static spring restraint.

(2) Center portions 130, 132 and 142, 144 minimize shifting of hinge axes 134, 136 and 146, 148 and of their respective pivot axes 114 and 116; and also the ratio of static spring restraint to structural strength of hinge 104 is minimized.

(3) Middle gimbal 108 is smaller in a direction transverse to axis 26 then upper gimbal 110 and lower gimbal 112 thereby minimizing the ratio of dynamic spring restraint to structural strength of hinge 104 and thereby making hinge 104 a compact flexure unit.

(4) Inner hinge 104 has a high ratio of axial strength parallel to axis 26 to shear strength parallel to axes 114, 116.

In summary, outer hinge 106 has certain advantages, as follows:

(1) Flexure bars 160, 162, 164, 166 similarly provide a uniform transverse elasticity and a uniform transverse static spring restraint.

(2) Center portions 172, 174, 186, 188 also minimize shifting of their hinge axes 176, 180, 190, 192 and also minimize the ratio of static spring restraint to structural strength.

(3) Outer hinge 106 has a high ratio of torsion strength about axis 26 relative to shear strength parallel to pivot axes 156, 158.

In summary, hinge assembly 16, or the combination of units 104 and 106, has certain advantages, as follows:

(1) Hinge assembly 16 has high ratios of both axial strength to shear strength and torsion strength to shear strength.

(2) Hinge assembly 16 is substantially equally elastic in four ways, that is, in three directions parallel to axes 26, 114, 116, and in torsion about axis 26.

(3) Hinge assembly 16 incorporates the individual advantages enumerated above of inner hinge 104 by itself and outer hinge 106 by itself.

While the present invention has been described in a preferred embodiment, it will be obvious to those skilled in the art that various modifications can be made therein within the scope of the invention. It is intended that the appended claims cover all such modifications.

What is claimed is:

1. A one-piece, three-gimbal, four-bar, universal-joint flexure unit comprising:
   a middle gimbal portion having a peripheral wall with a longitudinal axis and with axially-spaced end faces and having a first radial pivot axis and a second radial pivot axis disposed in quadrature with said longitudinal axis and intersecting therewith at a common pivot point;
   an upper end gimbal portion disposed axially outwardly of one of said middle gimbal end faces and having two flexure bars respectively integral therewith at one end thereof and cantilevered therefrom and axially spaced along said first pivot axis with respective fixed-end connections at the other end thereof to said middle gimbal portion; and
   a lower end gimbal portion disposed axially outwardly of the other of said middle gimbal end faces and having two flexure bars respectively integral therewith at one end thereof and cantilevered therefrom and axially spaced along said second pivot axis with respective fixed-end connections at the other end thereof to said middle gimbal portion.

2. A flexure unit as claimed in claim 1, in which the four flexure bars have the same-size cross-sections with the same-length radial offsets from said longitudinal axis for providing a uniform transverse elasticity and for providing a uniform transverse static spring restraint.

3. A flexure unit as claimed in claim 1, in which said four flexure bars have respective necked-down center portions with respective hinge axes for minimizing shifting of said pivot axes and for minimizing the ratio of static spring restraint to structural strength.

4. A flexure unit as claimed in claim 1, in which said middle gimbal is smaller in a direction transverse to said longitudinal axis than said upper gimbal and said lower gimbal for minimizing the ratio of dynamic spring restraint to structural strength and for providing a compact flexure unit.

5. A flexure unit as claimed in claim 1, in which said middle gimbal has a dynamic balance weight axially adjustable relative thereto for calibration of the dynamic spring rate of said middle gimbal for a fixed rotary speed.

6. A flexure unit as claimed in claim 5, in which said dynamic balance weight has a fine-tuning rod axially adjustable relative thereto for vernier-type calibration of said dynamic spring rate and for recalibration of said unit for a different fixed rotary speed.

7. A flexure unit as claimed in claim 1, and including:
   an outer middle gimbal ring disposed radially outwardly of said middle gimbal portion coaxially therewith along said longitudinal axis and along said pivot axes, and
   in which said upper end gimbal has two outer flexure bars integral therewith and cantilevered therefrom and axially spaced along said first pivot axis and disposed radially outwarly of its two flexure bars with respective fixed-end connections to said outer middle gimbal ring, and
   in which said lower end gimbal has two outer flexure bars integral therewith and cantilevered therefrom and axially spaced along said second pivot axis and disposed radially outwardly of its two flexure bars with respective fixed-end connections to said outer middle gimbal ring,
   for increasing the ratio of torsional strength relative to the axial strength of said flexure unit.

8. A two-axis gyro comprising:
   a rotor with a spin axis;
   a shaft with a shaft axis;
   a drive means connecting to said shaft; and
   a gimbal system as claimed in claim 1 interconnecting said rotor and said shaft with said upper gimbal being fixedly connected to said rotor coaxially therewith and with said lower gimbal being fixedly connected to said shaft coaxially therewith.

9. A gyro as claimed in claim 8, and including a torquer means carried by said rotor for tilting said rotor relative to said shaft and including a pickoff means carried by said rotor for sensing the direction and amount of said rotor tilt.

10. The combination of two radially-spaced, one-piece, three-gimbal flexure units comprising:
   an inner flexure unit according to claim 1; and
   an outer flexure unit according to claim 1 disposed radially outwardly of said inner flexure unit coaxially therewith.

11. A four-gimbal, universal-joint hinge comprising:
   an inner middle gimbal portion having a longitudinal axis and having a first pivot axis intersecting said longitudinal axis substantially at right angles thereto and having a second pivot axis intersecting said longitudinal axis and intersecting said first pivot axis substantially at right angles to said first pivot axis;
   an outer middle gimbal portion disposed radially outwardly of said inner middle gimbal coaxially therewith along said longitudinal axis and along said first pivot axis and said second pivot axis;
   a first end gimbal portion disposed axially outwardly of both said middle gimbals on one side thereof having a longitudinal axis intersecting said middle gimbal longitudinal axis at a pivot point and having two inner flexure bars axially spaced along said first pivot axis connecting to said inner middle gimbal and having two outer flexure bars also axially spaced along said first pivot axis connecting to said outer middle gimbal for pivoting of said first end gimbal relative to said middle gimbals about said first pivot axis; and
   a second end gimbal portion disposed axially outwardly of both said middle gimbals on the axially opposite side thereof and having a longitudinal axis intersecting the middle gimbal longitudinal axis at said pivot point and having two inner flexure bars axially spaced along said second pivot axis connecting to said inner middle gimbal and having two outer flexure bars also axially spaced along said second pivot axis connecting to said outer middle gimbal for pivoting of said middle gimbals relative to said second end gimbal about said second pivot axis.

12. A hinge as claimed in claim 11,
   in which said eight flexure bars have substantially the same-size cross-sections and
   in which said four inner bars have radial offsets from said longitudinal axis of equal length and
   in which said four outer bars have radial offsets from said longitudinal axis of equal length.

13. A hinge as claimed in claim 11,
   in which said four inner bars have respective longitudinal axes disposed parallel to said middle gimbal longitudinal axis, and
   in which said four outer bars have longitudinal axes disposed in a plane intersecting said middle gimbal longitudinal axis at right angles thereto.

14. The combination of two radially-spaced, one-piece, three-gimbal flexure units arranged in parallel comprising:
   two middle gimbals disposed adjacent to each other having a common longitudinal axis and having a common first pivot axis disposed at right angles to said longitudinal axis and having a common second pivot axis disposed at right angles to said first pivot axis;
   two radially-spaced end gimbals fixedly connected together and disposed axially outwardly of said middle gimbals on one side thereof and respectively connecting to said middle gimbals for pivoting about said first pivot axis; and
   two additional radially-spaced end gimbals fixedly connected together and disposed axially outwardly of said middle gimbals on the axially opposite sides thereof from said first two end gimbals and respectively connecting to said middle gimbals for pivoting about said second pivot axis.

15. The combination as claimed in claim 14,
   in which said first two end gimbals have two pairs of flexure bars axially spaced along said first pivot axis and respectively connecting to said two middle gimbals; and
   in which said two opposite end gimbals also have two pairs of flexure bars axially spaced along said second pivot axis and respectively connecting to said two middle gimbals.

16. An elongate three-gimbal, universal-joint hinge unit comprising:
   a first gimbal having a longitudinal axis and having a first pivot axis disposed substantially at right angles to said longitudinal axis with a first pair of axially-spaced pivots;
   a second gimbal connecting to said first pair of pivots for pivoting about said first pivot axis and having a second pivot axis disposed substantially at right angles to said first pivot axis with a second pair of axially-spaced pivots;
   a third gimbal ring connecting to said second pair of pivots for pivoting about said second pivot axis;
   said first and third gimbals having respective radially outer surfaces with respective diameters substantially equal to each other; and said second gimbal having a radially outer surface with a diameter slightly smaller than said diameters of said first gimbal and of said third gimbal.

17. A flexure-joint-suspended, free-rotor gyro comprising:
a support means with an axis of rotation;
a shaft mounted in said support for rotation relative thereto;
a rotor with an axis of rotation intersecting the shaft axis at a pivot point for tilting relative thereto;
a three-gimbal hinge as claimed in claim 16; and
in which said shaft has a radially outer surface with an outer diameter which is larger than said outer diameter of said second gimbal.

18. A two-axis gyro, including:
a flywheel with a spin axis;
a motor having a shaft with a shaft axis;
a one-piece elongate flexure means with one end fixedly connecting to said flywheel coaxially therewith and with an opposite end fixedly connecting to said shaft coaxially therewith;
said flexure means having a positive static spring restraint urging said flywheel in alignment with said shaft and urging a decreasing tilt angle therebetween at a substantially constant spring rate when said flywheel is in a tilted position relative to said shaft; and
said flexure means having a middle gimbal portion for oscillating when said flywheel is in a tilted position during simultaneous rotation of said flywheel and said shaft and for generating a negative dynamic spring restraint and urging an increasing tilt angle therebetween, said middle gimbal portion being sized and balanced whereby said negative dynamic spring rate substantially cancels and offsets said positive static spring rate at a certain operating rotor speed.

19. An inside-out, two-axis gyro, comprising:
a rotor with a spin axis;
a motor with a shaft having a shaft axis; and
a pair of gimbal units arranged in parallel and respectively connecting said flywheel to said shaft, said gimbal units comprising:
a pair of rotor gimbals coaxial with said rotor along said spin axis;
a pair of shaft gimbals coaxial with said shaft along said shaft axis; and
a pair of middle gimbals disposed between said rotor gimbals and said shaft gimbals.

20. A gyro comprising:
a motor,
a shaft,
a one-piece, gimbal-type hinge assembly interconnecting said shaft and said rotor,
a drive means connecting to said shaft,
a support housing supporting said shaft, said rotor and said drive,
a torquer means for varying the tilt of said rotor,
a pickoff means for sensing said tilt,
said rotor having a rim portion, a web portion and a hub portion,
said shaft having an upper end portion connected to said hinge assembly and a center portion supported by said housing and a lower end portion connecting to said drive,
said drive having an outer wound stator connecting to said housing and having an inner armature connecting to said shaft lower end,
said housing having an annular frame for connection to a vehicle and an upper cap member for enclosing said rotor and a lower cap member for enclosing said drive,
said frame having an annular plate with a center bearing sleeve journaled on said shaft and having an upper flange connecting to said upper cap and having a lower flange connecting to said lower cap,
said frame sleeve having a pair of ball-bearing units press-fitted over said shaft center portion,
said plate having four pickoff support bars for support of said pickoff means and having a torquer support ring for support of said torquer means,
said pickoff means having an annular magnet ring connecting to said rotor web and having four coils wound on said pickoff support bars,
said torquer means having a magnet connecting to said rotor rim and having a coil connecting to said torquer support ring,
said hinge assembly including an inner hinge unit and an outer hinge unit,
said inner hinge unit having a middle gimbal and an upper end gimbal and a lower end gimbal,
said upper inner gimbal having two inner bars connecting to said inner middle gimbal and said inner lower gimbal having two inner bars connecting to said inner middle gimbal,
said outer hinge unit having an outer middle gimbal and an outer upper gimbal and an outer lower gimbal,
said outer upper gimbal having two flexure bars connecting to said outer middle gimbal and said outer lower gimbal having two flexure bars connecting to said outer middle gimbal.

References Cited

UNITED STATES PATENTS

| | | | |
|---|---|---|---|
| 2,966,049 | 12/1960 | Ormond | 308—2 |
| 3,264,880 | 8/1966 | Fischel | 74—5 |
| 3,288,541 | 11/1966 | Tracy | 308—2 |
| 3,301,073 | 1/1967 | Howe | 74—5 |

FRED C. MATTERN, JR., *Primary Examiner.*

C. J. HUSAR, *Assistant Examiner.*